United States Patent [19]

Murray

[11] Patent Number: 5,396,387
[45] Date of Patent: Mar. 7, 1995

[54] AIR BEARING MAGNETIC HEAD SLIDERS
[75] Inventor: Stephen S. Murray, Fremont, Calif.
[73] Assignee: Read-Rite Corporation, Milpitas, Calif.
[21] Appl. No.: 236,145
[22] Filed: May 2, 1994

Related U.S. Application Data

[63] Continuation of Ser. No. 982,853, Nov. 30, 1992, abandoned.

[51] Int. Cl.$^6$ .......................... G11B 5/60; G11B 21/21
[52] U.S. Cl. ..................................................... 360/103
[58] Field of Search ......................... 360/103, 104–105

[56] References Cited

U.S. PATENT DOCUMENTS

| | | | |
|---|---|---|---|
| 4,894,740 | 1/1990 | Chhabra et al. | 360/103 |
| 5,062,017 | 10/1991 | Strom et al. | 360/103 |
| 5,128,821 | 7/1992 | Takeuchi et al. | 360/103 |
| 5,175,658 | 12/1992 | Chang et al. | 360/103 |
| 5,212,608 | 5/1993 | Yoneoka | 360/103 |
| 5,218,494 | 6/1993 | Chapin et al. | 360/103 |

FOREIGN PATENT DOCUMENTS 60-101781  6/1985  Japan .................................. 360/103

Primary Examiner—John H. Wolff
Attorney, Agent, or Firm—Nathan N. Kallman

[57] ABSTRACT

The air bearing surface (ABS) of a head slider is formed with configured rails and leading edge tapers. In implementations of the invention, two side rails extend only partially from leading edge tapers to the slider trailing edge. The inner edges of each side rail are formed with at least two opposing angles so that at least two rail sections vary in width along the length of the rail. Each side rail is shaped with an oblique angle to reduce the rail width and a reverse angle to form the sections of differing widths. The leading edge side tapers may be angled for control of pitch stiffness of the slider. In one embodiment of the invention, a third center rail extends from a center taper to the slider trailing edge where the transducer is located. In another embodiment, a short center pad is provided at the trailing edge. In an alternative design, only two side rails are used without a center rail or pad. The ABS geometries disclosed herein include angled rail sections that provide controlled pitch and constant flying height during transducing operation in a disk drive.

2 Claims, 3 Drawing Sheets

AIR BEARING MAGNETIC HEAD SLIDERS

This application is a continuation of application Ser. No. 07/982,853, filed Nov. 30, 1992, now abandoned.

FIELD OF THE INVENTION

This invention relates to air bearing magnetic head sliders used in disk drives and in particular to air bearing surface (ABS) geometries.

BACKGROUND OF THE INVENTION

Magnetic recording heads used in disk drives typically incorporate air bearing sliders carrying magnetic transducers that fly over the surface of a magnetic disk for transducing data signals. One objective for improving the transducing relationship between a magnetic transducer and a magnetic disk is to provide a close spacing between the transducer and the disk. When used with very narrow transducing gaps and very thin magnetic record films, the close spacing allows short wavelength, high frequency signals to be recorded, thereby affording high density, high storage capacity recording. It is also desirable to maintain a substantially constant flying height and a tightly controlled pitch of the slider relative to the disk surface. To realize controlled pitch and constant flying height, pitch stiffness of an air bearing slider needs to be controlled. Presently known air bearing sliders incorporate tapered portions at the leading edge and rails following the tapered portions. One problem that exists with known prior art air bearing sliders having leading edge tapered portions is that the attitude or pitch of the flying head is sensitive to variations in the length of the tapered portions. Thus the lengths of the tapers formed on the air bearing surface of the sliders need to be inspected and measured at the manufacturing facility to ascertain that the sliders meet specifications. The inspection process is costly and time-consuming. Only those sliders that pass the test are used, with a resultant loss in production yield. Apparently, control of taper length and pitch is very significant, particularly when the flying heads are used in small disk drives having many start/stop cycles.

A major objective in disk drive design is to make smaller compact drives with smaller components. As a result, head suspensions and head sliders have been progressively reduced in size. It is highly desirable to make a shortened slider body without sacrificing pitch stiffness control and constant flying height.

SUMMARY OF THE INVENTION

An object of this invention is to provide an air bearing for a reduced size form factor slider configuration that makes the flight attitude of the slider less sensitive to taper length.

Another object of this invention is to provide an air bearing slider having controlled pitch stiffness.

Another object is to provide a shortened air bearing slider having a surface geometry characterized by an increased pitch stiffness and which operates at a substantially constant flying height.

According to this invention, the air bearing surface (ABS) of a head slider is formed with configured rails and leading edge tapers. Two side rails extend only partially from leading edge tapers to the slider trailing edge. The inner edges of the side rails are formed with at least two opposing angles so that more than two rail sections of different widths are defined and at least two rail sections vary in width along the length of the rail. Each side rail is shaped with an oblique angle to reduce the rail width and a reverse angle to form the sections of differing widths. The leading edge side tapers may be angled for control of pitch stiffness of the slider. In the preferred embodiments, a third center rail extends from a center taper to the slider trailing edge where the transducer is located. In another embodiment, a short center pad is provided at the trailing edge. In an alternative design, only two side rails are used without a center rail or pad. The ABS geometries disclosed herein include tapers of defined lengths within a given range and angled rail sections that produce controlled pitch and substantially constant flying height during transducing operation in a disk drive.

DESCRIPTION OF THE DRAWINGS

The invention will be described in greater detail with reference to the drawings in which.

DETAILED DESCRIPTION OF THE INVENTION

Figure 1A:
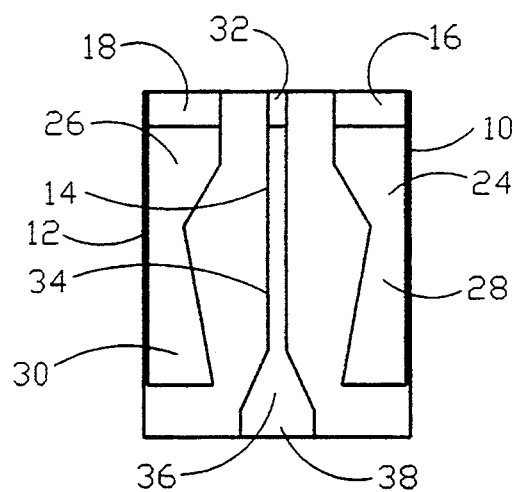
FIGS. 1A and 1B are plan and isometric views respectively of the air bearing surface (ABS) of a tri-rail air bearing slider, according to this invention.
Figure 1B:
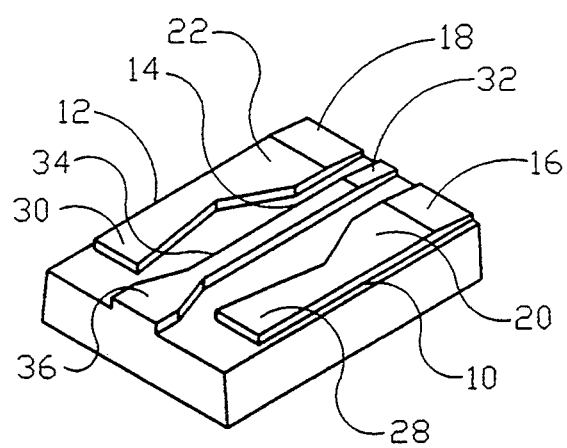

With reference to FIGS. 1A and 1B, the air bearing surface of a head slider is etched to define configured side rails 10 and 12 and a center rail 14. The side rails 10 and 12 extend from tapered sections or tapers 16 and 18 respectively formed at the leading edge of the slider, but the trailing portions of the side rails do not extend to the trailing edge of the slider. The outer edges of the shortened side rails are collinear with the outer edges of the tapers. Each of the rails 10, 12 has respectively (a) a substantially rectangular front section 20, 22 following the tapers 16, 18 with the inner edges of the front section being in line with the inner edges of the tapers; (b) a quadrilateral or trapezoidal section 24, 26 defined by an edge having an oblique angle that narrows the rail section 24, 26 as it progresses towards the center of the slider body; and (c) a flared section 28, 30 with a reverse angle that widens the rail as it progresses towards the trailing edge of the slider without reaching the trailing edge. In this embodiment, the narrowest width the rails is preferably about 0.2 to 0.95 the widest width of the rails. When the width at the front of the rail is greater than the width at the center or rear portion of the rail, the pitch of the slider will be greater than that experienced with conventional sliders having rails of rectangular designs.

Figure 3:
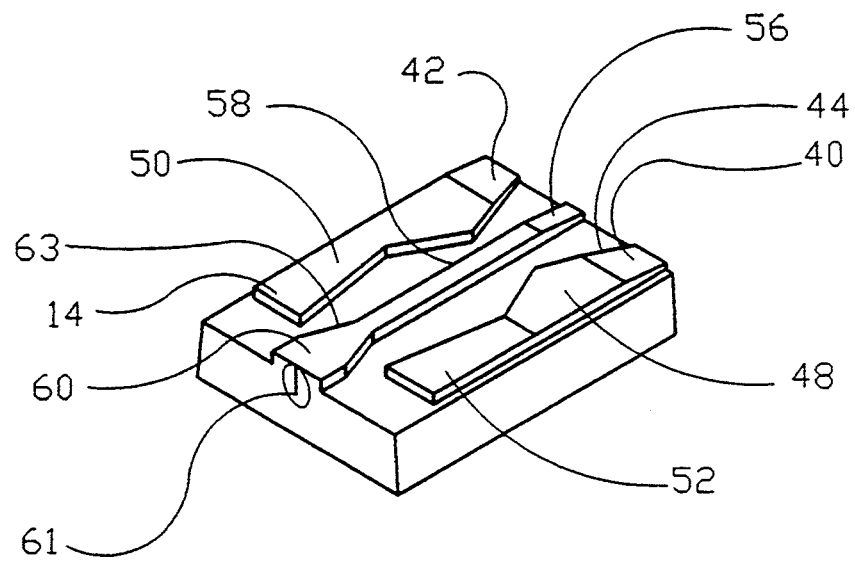
FIG. 3 is an isometric view of the slider of FIG. 2.

The slider shown in FIGS. 1a and 1b includes a narrow third center taper 32 followed by a relatively long section 34 of rail 14 having substantially the same width as the taper 32. The center taper 32 and center rail 14 extend longitudinally from the leading edge of the slider and are centered about the central longitudinal axis of the slider. The rail 14 flares out from the narrow section 34 to form a conical section 36 and the rail 14 is terminated with a short rectangular section 38 between the flared section 36 and the slider trailing edge. In effect, the rail 14 is configured in a funnel-like geometry. A thin film transducer 61 (as shown in FIG. 3) is disposed at the trailing end of the slider substantially close to the central longitudinal axis, as is known in the art. With the geometry defined in the slider of FIG. 1, pitch stiffness is improved by the "necking down" or constriction of the rails 10 and 12 close to the lateral center of the slider. The center rail 14 enhances the stability of the slider when the slider is flying relative to a disk surface.

Figure 2:
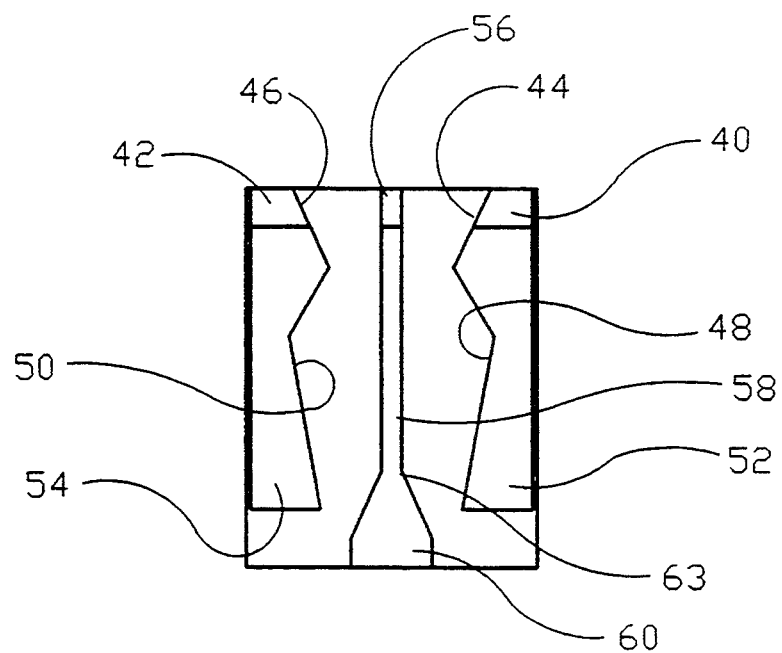
FIG. 2 is a plan view of a modified version of the design of the ABS of FIG. 1A.

FIGS. 2 and 3 illustrate a modified version of the slider shown in FIG. 1. Front side tapers 40 and 42 are formed with inner angled sides 44 and 46 respectively that widen the tapers. The angle continues at the front end of the side rails 48 and 50 and then reverses to constrict the width of the rails. The trailing portions 52 and 54 of the side rails flare out. The partial rails do not extend to the slider trailing edge.

The center taper 56 is followed by a narrow longitudinal rail section 58 and a funnel-type section 60. The throat 63 of the funnel-type section which is connected to the narrow rail section 58 is aligned with the trailing ends of rails 48 and 50. The air bearing surface is characterized by pitch stiffness and insensitivity to the length of the tapers. Therefore, manufacturing specifications are not as stringent as required with prior known slider production processes. The trailing edges of the side rails 48 and 50 will fly higher with increasing disk velocity, and slider pitch also increases with increasing disk velocity.

Figure 4:
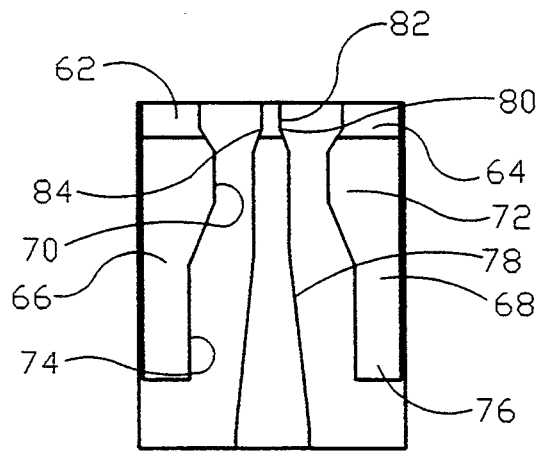
FIG. 4 is a plan view of an alternative ABS geometry.
Figure 5:
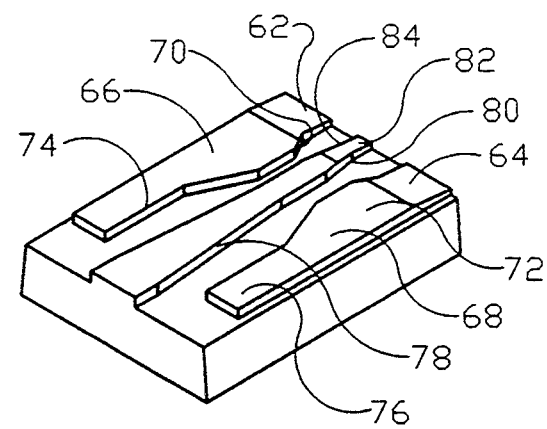
FIG. 5 is an isometric view of the slider of FIG. 4.

With reference to FIGS. 4 and 5, the ABS of the slider includes side tapers 62 and 64 configured with front rectangular portions followed by a portion widening at an angle that continues at the front portions of side rails 66 and 68. The following rail portions 70 and 72 are substantially rectangular and define the widest width of the side rails. The rectangular trailing portions 74 and 76 of the shortened rails 66 and 68 have a reduced width.

The center rail 78 of the three-rail configuration is formed with a front taper 80 having a leading edge rectangular portion 82 and a flared portion 84 with an angle which extends into the front portion of the rail 78. The rail 78 widens gradually as it progresses close to the trailing edge of the slider.

The slider depicted in FIGS. 4 and 5 has an air bearing, which is virtually insensitive to roll and has the added feature of substantially constant pitch over a range of taper lengths.

Figure 6A:
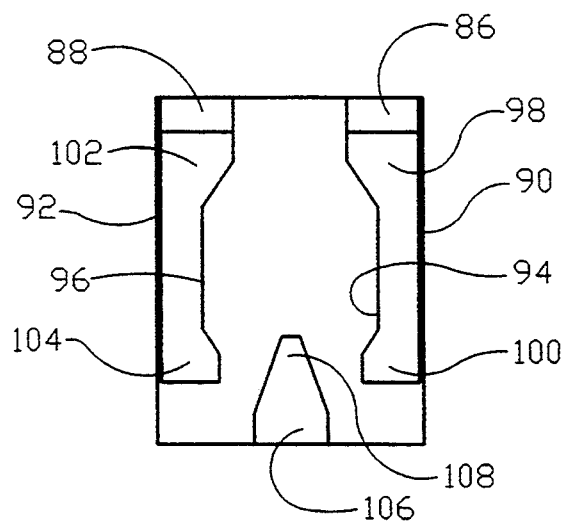
FIGS. 6A and 6B are plan and isometric views respectively of another alternative ABS geometry.
Figure 6B:
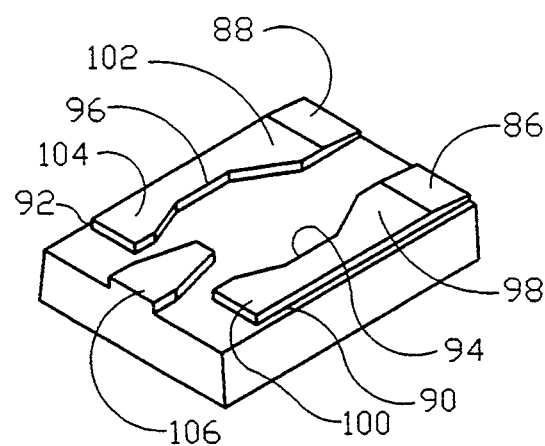

FIGS. 6a and 6b illustrate a tripad ABS having wide front rectangular tapers 86 and 88 followed by U-type shortened rails 90 and 92. The center portions 94 and 96 of the rails 90 and 92 are narrowed rectangular segments disposed between legs or polygon-type sections 98, 100 and 102, 104 of rails 90 and 92 respectively. The widest width of sections 98, 100, 102 are of the same width as that of tapers 86 and 88.

A center pad 106 is formed preferably in a wedge shape with a nose 108 between the sections 100 and 104 of the rails 90 and 92. With this design in which the width of the trailing edge of each side rail is greater than the minimum width of the rail, an increase in pitch stiffness is realized.

Figure 7:
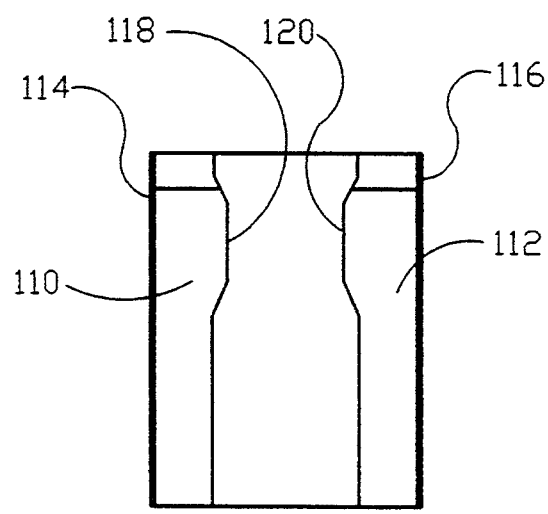
FIG. 7 is a plan view of a two-rail ABS of a slider.
Figure 8:
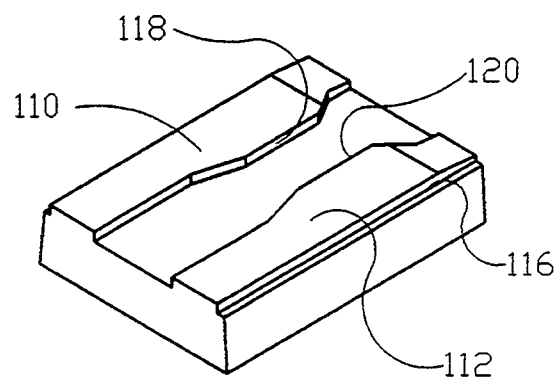
FIG. 8 is an isometric view of the slider of FIG. 7.

The slider ABS shown in FIG. 7 and 8 has side rails 110 and 112 of substantially similar design as that shown in FIGS. 4 and 5, except that there is no center rail. Also, the two rails 110 and 112 extend the entire way to the trailing edge of the slider. Constant pitch is achieved by varying the rail width over a given range of taper length. Leading edge tapers 114 and 116 terminate in a bend, angled to widen the tapers. The bend or angle of the tapers continue at the beginning of the rails and reverse angles to form rectangular sections 118 and 120. Before reaching the midpoint of the slider, a bend is introduced to narrow the rails. After the midpoint, the rails narrow and assume a rectangular shape that extends to the trailing edge of the slider. As a result, the center of lift stays substantially constant with respect to taper length at a given pitch angle. Relief strips 114 and 116 are provided at the periphery of the slider along the outer sides of the rails 110 and 112. The slider design of FIGS. 7 and 8 is advantageous for use in small diameter disk drives, 2.5 inch disks or less, where increased pitch provides earlier and slower liftoff, thus reducing start/stop wear.

During production, the central areas between the rails and tapers of the air bearing surface of the sliders are etched and recessed. However, the relief strips along the sides may be cut, by sawing for example, or etched or ground.

Figure 9:
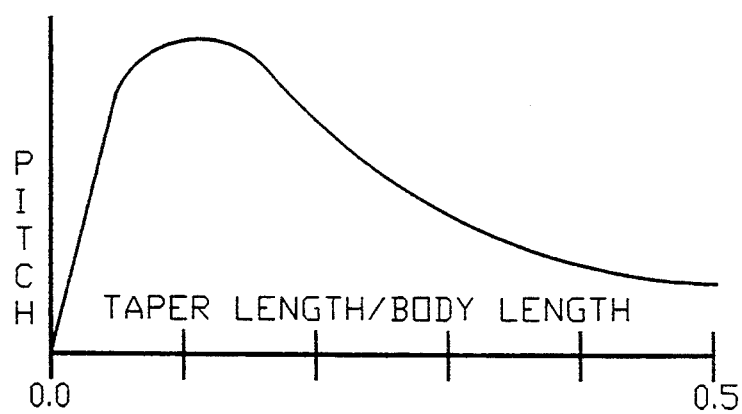
FIG. 9 is a plot showing pitch versus taper length for a slider with constant rail width, as used in the prior art.

FIG. 9 shows the variation in pitch of a slider formed with constant rail width, where the ratio of taper length to slider body length is 0.5 or less. It is apparent that slider pitch varies substantially for different taper lengths using a conventional slider. A substantially constant pitch is achieved over a range of taper lengths. Thus, pitch and flight attitudes and less sensitive to taper length, which makes inspection of taper length during head production easier with resultant improved yields.

Figure 10:
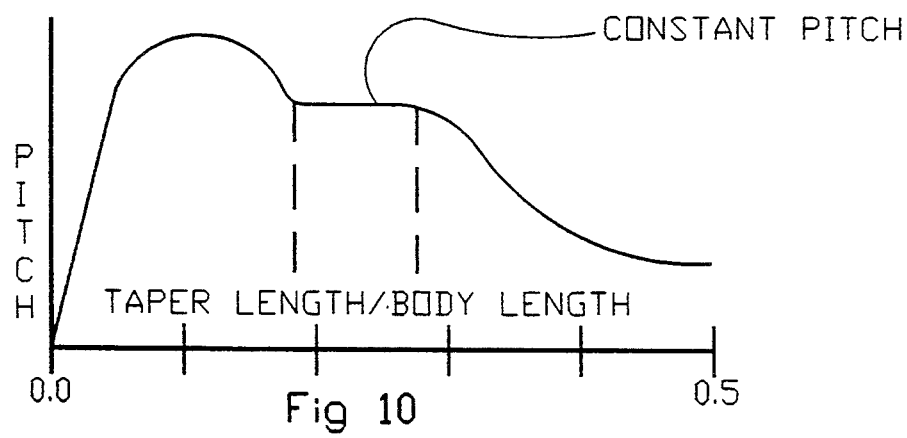
FIG. 10 is a plot showing pitch versus taper length for a slider with a modified geometry, made in accordance with this invention.

With reference to FIG. 9, the illustrated curve shows the variations of pitch of a prior art slider having constant rail width over a range of taper lengths. Such variations would adversely affect the signal being recorded on or read out from a magnetic medium, such as a magnetic disk. FIG. 10 delineates the modified pitch characteristic resulting from the change in air bearing rail and taper geometry for the same range of taper lengths, as realized with the present invention. With the configured air bearing rails and tapers of this invention, the center of lift stays constant with respect to taper length at the specified pitch angle.

What is claimed is:

1. A magnetic head slider having an air bearing surface with a leading edge and a trailing edge and having a central longitudinal axis extending from said leading edge to said trailing edge and first and second sides substantially parallel to said axis and perpendicular to said edges comprising:

first and second tapers disposed at said leading edge adjacent to said first and second sides respectively;

first and second rails extending from said tapers partially to said trailing edge;

a third taper disposed at said leading edge and centered substantially along said central axis;

a third rail extending from said third taper to said trailing edge;

each of said first and second rails having at least two portions which vary in width, said third taper formed with a rectangular portion extending from said leading edge and a flared portion following said rectangular portion, said flared portion widening at an angle;

said third rail formed with a first flared portion following said third taper, said first flared portion defining an angle the same as said angle of said flared portion of said third taper, said third rail having a substantially rectangular portion following said first flared portion of said third rail and having a second flared portion following said rectangular portion of said third rail towards said trailing edge.

2. A magnetic head slider as in claim 1, wherein said third taper is narrower than said first and second tapers.

* * * * *